United States Patent
Galloway et al.

(10) Patent No.: US 7,824,533 B2
(45) Date of Patent: Nov. 2, 2010

(54) TEMPERED PLATED WIRE AND METHODS OF MANUFACTURE

(75) Inventors: Steve Galloway, Fridley, MN (US); Karl Lundahl, Stanchfield, MN (US); Jeremy Sizer, Ramsey, MN (US); Jodi Boldenow, Ramsey, MN (US)

(73) Assignee: Industrial Door Co., Inc., Coon Rapids, MN (US)

( * ) Notice: Subject to any disclaimer, the term of this patent is extended or adjusted under 35 U.S.C. 154(b) by 1587 days.

(21) Appl. No.: 11/115,624

(22) Filed: Apr. 27, 2005

(65) Prior Publication Data
US 2006/0086436 A1    Apr. 27, 2006

Related U.S. Application Data

(60) Provisional application No. 60/621,847, filed on Oct. 25, 2004.

(51) Int. Cl.
*C25D 5/00* (2006.01)
(52) U.S. Cl. .......................................... 205/80
(58) Field of Classification Search .................. 205/80
See application file for complete search history.

(56) References Cited

U.S. PATENT DOCUMENTS

| | | | |
|---|---|---|---|
| 4,201,650 A | 5/1980 | Nagano et al. | |
| 4,276,133 A | 6/1981 | Nagano et al. | |
| 4,282,273 A | 8/1981 | Bucker et al. | |
| 4,563,216 A | 1/1986 | Knaster et al. | |
| 4,609,803 A * | 9/1986 | Inoue ...................... | 219/69.12 |
| 4,725,340 A | 2/1988 | De Filippo et al. | |
| 4,788,394 A | 11/1988 | Vanneste et al. | |
| 5,015,341 A | 5/1991 | Guzzetta et al. | |
| 5,087,342 A | 2/1992 | Stokes | |
| 5,203,985 A | 4/1993 | Nishimura et al. | |
| 5,284,680 A | 2/1994 | Bilimoria | |
| 5,391,290 A | 2/1995 | Ichiba et al. | |
| 5,411,812 A | 5/1995 | Bilimoria | |
| 5,556,211 A | 9/1996 | Kwon | |
| 6,813,923 B2 | 11/2004 | Jones et al. | |
| 2002/0043092 A1 * | 4/2002 | Jones et al. ................ | 72/342.1 |

FOREIGN PATENT DOCUMENTS

EP        0931860        12/1997

OTHER PUBLICATIONS

Huges, David L., "The Heat Treatment of Ferrous Fasteners: Part II—Post-Processing", posted Jun. 1, 2000, http://www.industrialheating.com/CDA/ArticleInformation/features/BNP__Features__Item/0,2832,7951,00html.

* cited by examiner

*Primary Examiner*—Harry D Wilkins, III
*Assistant Examiner*—Zulmariam Mendez
(74) *Attorney, Agent, or Firm*—Kinney & Lange, P.A.

(57) ABSTRACT

The present invention is a method of manufacturing plated wire. The method includes drawing a feed stock to form drawn wire, tempering the drawn wire to form tempered wire and plating the tempered wire to form the plated wire. The plated wire exhibits a tensile strength that substantially meets ASTM A229-99.

16 Claims, 1 Drawing Sheet

TEMPERED PLATED WIRE AND METHODS OF MANUFACTURE

CROSS-REFERENCE TO RELATED APPLICATION(S)

Priority is claimed under U.S. Provisional Patent Application No. 60/621,847, entitled "Tempered Plated Wire and Methods of Manufacture", and filed on Oct. 25, 2004, and which is incorporated herein by reference in its entirety.

BACKGROUND OF THE INVENTION

The present invention relates to wire articles and methods of manufacturing wire articles. In particular, the present invention relates to wire articles manufactured by processes that include a combination of tempering and plating.

Wire is used to form a variety of industrial products, such as springs, wire screens, and cable. Accordingly, different types of wire are manufactured through different processes, each of which affect the physical properties of the wire (e.g., tensile strength, surface qualities, and other metallurgic properties). For example, wire may be tempered, which involves a series of heating and cooling steps to obtain desired martensitic properties of the wire (e.g., hardness, ductility, and tensile strengths).

Oil tempering is the most common tempering technique used to manufacture wire. Oil tempering involves cold drawing the wire down to a desired size, and then heat tempering the wire in a furnace with lead. While this process provides wire with acceptable martensitic properties, the resulting wire is also oily, which reduces the aesthetic qualities of the wire.

A common drawback with tempered wire is that the resulting wire exhibits an unfinished surface. This reduces the aesthetic qualities of the wire and leaves the wire exposed to rusting, which may decrease the life of the wire. Nonetheless, tempered wire currently used in the industry is not plated with a finished surface. Accordingly, there is a need for a process to manufacture wire that combines the martensitic properties of tempering and the finished surfaces obtained by plating.

BRIEF SUMMARY OF THE INVENTION

The present invention is directed to a method of manufacturing plated wire. The method includes drawing a feed stock to form drawn wire, tempering the drawn wire to form tempered wire, and plating the tempered wire to form the plated wire. The plated wire exhibits a tensile strength that substantially meets ASTM A229-99.

The present invention is further directed to a system for manufacturing wire having a finished surface. The system includes a heat induction tempering apparatus for tempering the wire, and an electroplating apparatus for providing the finished surface on the wire.

The present invention is further directed to an article that exhibits a tensile strength that substantially meets ASTM A229-99. The article includes a tempered wire and a finished surface disposed on the tempered wire, where the finished surface includes a plating compound.

While the above-identified drawings set forth an embodiment of the invention, other embodiments are also contemplated, as noted in the discussion. In all cases, this disclosure presents the invention by way of representation and not limitation. It should be understood that numerous other modifications and embodiments may be devised by those skilled in the art, which fall within the scope and spirit of the principles of the invention. The figures may not be drawn to scale. Like reference numbers have been used throughout the figures to denote like parts.

DETAILED DESCRIPTION

The present invention is directed to wire that is manufactured by (1) tempering, to provide desired physical strengths for the wire, and (2) plating, to provide a finished surface on the wire. The wire manufactured pursuant to the present invention exhibits good physical strengths (e.g., good martensitic properties), good aesthetic qualities, and rust resistance, for use as a variety of industrial products. In one embodiment, the wire manufactured pursuant to the present invention has a finished surface and exhibits a tensile strength that substantially meets ASTM A229-99. The term "finished surface" is defined herein as a thin layer of a plating compound that extends substantially around the exterior surface of tempered wire.

Figure 1:
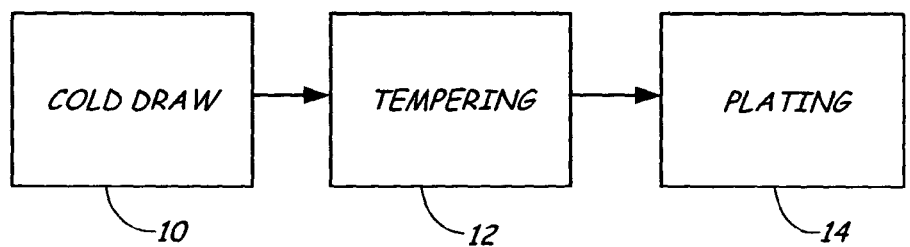
FIG. 1 is a block diagram illustration of a method of the present invention.

FIG. 1 is a block diagram illustration of a method used to manufacture wire, pursuant to the present invention. As depicted at block 10, a feed stock is drawn to form wire having a desired wire diameter. For example, the wire may be cold drawn from a stock steel rod to obtain the desired wire diameter. Examples of suitable wire diameters range from about 0.5 millimeters (mm) to about 16.0 mm.

After drawing, the wire is then tempered (block 12) to obtain the desired martensitic properties. Examples of suitable tempering techniques include conventional tempering techniques, such as oil tempering and heat induction tempering. In one embodiment, the wire is tempered via heat induction tempering. Heat induction tempering involves running the wire through an alternating-current magnetic field. The alternating-current magnetic field induces a current within the wire, which correspondingly heats the wire in a non-contact manner. Examples of suitable heat induction systems for use with the present invention include heat induction systems commercially available from Radyne Corporation, England, United Kingdom. Such systems generally use a series of coil assemblies to provide the alternating-current magnetic field.

An example of a suitable method for heat induction tempering the wire includes initially passing the wire through a first coil assembly to heat the wire by induction to a temperature of up to about 700° C. The wire then passes through a second coil assembly to heat the wire by induction to a temperature of up to about 1100° C. After the initial heating, the wire passes through a third coil assembly to hold the temperature of the wire by induction at a holding temperature of up to about 1100° C.

After heating, the wire is then quenched in a water bath maintained at about 32° C. to about 38° C. to rapidly cool the wire, and increase the hardness of the wire. The quenching may involve immersing the wire in the bath, spraying the wire with the bath water, and combinations thereof. After the quenching, the wire then passes through a fourth coil assembly to heat the wire by induction to a temperature of up to about 600° C. for tempering the wire. Finally, the wire is quenched in a controlled manner through a series of water baths ranging in temperature from about 28° C. to about 32° C. to provide the desired properties of the wire. The controlled quenching may also involve immersing the wire in the baths, spraying the wire with the bath water, and combinations thereof.

The size and power requirements of the coil assemblies required to heat the wire up to the above-listed temperatures will vary based on the wire sizes, the line speeds of the wire, the wire compositions, and the efficiencies of the coil assemblies. Examples of particularly suitable heat induction temperatures provided by the coil assemblies include an initial temperature of up to about 600° C., a subsequent temperature and a temper hold temperature each up to about 1100° C., and a post-initial quench tempering temperature up to about 600° C.

After tempering, the wire is plated (block 14) with a plating compound to provide a finished surface on the tempered wire. Examples of suitable plating compounds include zinc, tin, nickel, copper, other plating mediums, derivatives thereof, salts thereof (e.g., zinc sulfate and zinc chloride), and combinations thereof. Examples of suitable plating techniques include extrusion coating, dip coating, knife coating, deposition coating, electroplating, thermal diffusion galvanization, and combinations thereof.

In one embodiment, the wire is plated by an electroplating technique, such as electrodeposition (i.e., electrogalvanization). Examples of suitable electroplating systems for use with the present invention include systems commercially available from Otomec srl, Olignate, Italy. An example of suitable processing conditions for electroplating the wire includes feeding the wire through a plating solution that contains a dissolved plating compound and is charged with an electrical current. Examples of suitable electrical currents range from about 2,000 amps to about 4,000 amps. The electrical current breaks down the plating compound, which then adheres to the outer surface of the wire as a finished surface.

As with the heat induction system, the size and power requirements of the electroplating systems required to plate the wire will vary based on the wire sizes, the line speeds of the wire, the wire compositions, and the efficiencies of the electroplating systems.

The above-discussed method of manufacturing wire pursuant to the present invention may also include additional manufacturing steps. For example, the method may also include a post-draw cleaning to clean the wire before heat induction tempering. Additionally, a descaling step may be used to remove iron oxide prior to plating.

Figure 2:
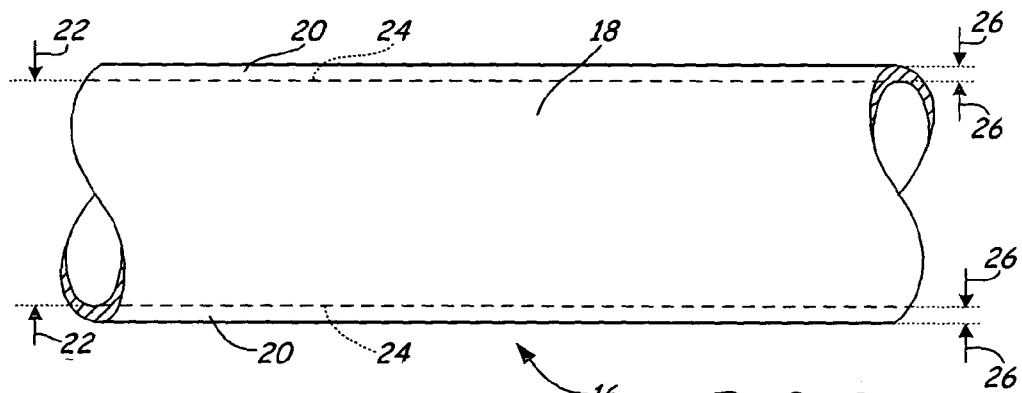
FIG. 2 is a sectional view of a wire of the present invention.

FIG. 2 is a sectional view of a manufactured wire 16 that has been drawn, tempered, and plated pursuant to the present invention. As shown, the manufactured wire 16 includes a tempered wire 18, which is coated with a finished surface 20. The tempered wire 18 may be drawn from a feed stock of any suitable metal material to obtain a wire diameter 22 and an outer surface 24. Examples of suitable wire diameters 22 range from about 0.5 mm to about 16.0 mm, as previously discussed. In one embodiment, the metal material is an electrically conductive material (e.g., steel) for heat induction tempering. Table 1 provides an example of a suitable composition for the tempered wire 18, where the weight percents of the components are based on the entire weight of the tempered wire 18.

TABLE 1

| Composition | Percent by Weight |
| --- | --- |
| Carbon | 0.55-0.85 |
| Manganese | 0.30-1.20 |
| Phosphorous | 0.04, max |
| Sulfur | 0.05, max |
| Silicon | 0.15-0.35 |
| Steel | Balance |

The finished surface 20 is a layer disposed on the outer surface 24 of the tempered wire 18, and contains the plating compounds that adhere to the outer surface 24. After plating, the finished surface 20 exhibits a thickness 26. Examples of suitable thicknesses 26 range from about one micron to about six microns. The finished surface 20 protects the tempered wire 18 from external conditions (e.g., rusting) and provides aesthetic qualities to the manufactured wire 16. In addition, the tempering allows the manufactured wire 16 to obtain desired martensitic properties. Examples of suitable martensitic properties of the manufactured wire 16 include properties that substantially meet one or more of ASTM A229-99, ASTM A230-99, ASTM A231-04, ASTM A232-99, ASTM A401-03, ASTM A877-99, ASTM A878-00, and ASTM A1000-05. Examples of particularly suitable martensitic properties of the manufactured wire 16 include tensile strengths that substantially meet ASTM A229-99. These above-listed martensitic properties allows the manufactured wire 16 to be used in industrial applications, such as in the formation of torsion springs and extension springs.

Figure 3:
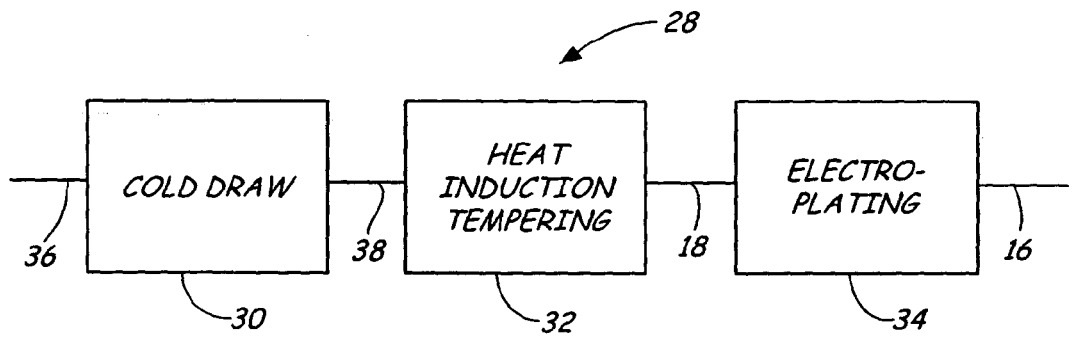
FIG. 3 is a block diagram illustration of a preferred method of the present invention.

FIG. 3 is a block diagram illustration of another embodiment of the present invention, referred to herein as an in-line process 28. The in-line process 28 is similar to the method of the present invention disclosed in FIG. 1, and includes cold drawing (block 30), heat induction tempering (block 32), and electroplating (block 34), and further includes moving the wire at a line speed in a continuous process. The wire may be moved via a conventional mechanism, such as a pulley system with drive wheels. As shown in FIG. 3, a supply of feed stock 36 is drawn to a desired diameter at block 30 to obtain a pre-tempered wire 38. The pre-tempered wire 38 is then heat induction tempered at block 32 to obtain the tempered wire 18. After tempering, the tempered wire 18 is electroplated at block 34 to obtain the manufactured wire 16, which contains the finished surface 20 on the tempered wire 18. The heat induction tempering and the electroplating may be performed with the systems and processing conditions discussed above in FIG. 1.

Examples of suitable lines speeds for the wire (e.g., the pre-tempered wire 38, the tempered wire 18, and the manufactured wire 16) range from about 50 meters-per-minute to about 250 meters-per-minute. As depicted in FIG. 3, the pre-tempered wire 38 and the tempered wire 18 are preferably drawn through blocks 32 and 34 (e.g., tempering and plating) in a single continuous process at the given line speed. More preferably, the feed stock 36 is also fed to the cold drawing block 30 in the same continuous process, as well. With these preferred embodiments, the in-line process 28 provides several advantages that overcome conventional problems of tempering and plating wire.

First, the in-line process 28 minimizes the presence of oxide scale. An oxide scale (e.g., an iron oxide scale) is generally produced when iron is heated. As such, wire that has been heat treated, quenched, and tempered contains iron oxide scale. The amount of oxide scale present on the wire depends upon time of exposure to air. Generally, the longer exposure time to the air, the more oxide scale is created on the surface of the wire. A drawback to having oxide scale on the wire is that the oxide scale reduces adhesion. As such, the oxide scale must be removed before plating processes will adhere, which would require a descaling step prior to the plating process. Conventional plating techniques use an acid wash to remove oxide scale prior to the application of the plating. However, acid wash increases hydrogen embrittlement (discussed below), is expensive, and is environmentally undesirable.

The in-line process 28, however, minimizes the presence of oxide scale, which substantially reduces or eliminates the need for a descaling process prior to the plating. Because the tempered wire 18 is fed between blocks 32 and 34 in a continuous process at a rapid line speed, the tempered wire 18 is minimally exposed to ambient air. This reduces or results in a negligible amount of oxide scale accumulation on the tempered wire 18. As such, the tempered wire 18 may be plated at block 34 after minimal wire preparation to remove the oxide scale, or alternatively, without requiring an intermediate step to remove the oxide scale.

In addition to the descaling issues, subjecting the tempered wire 18 to secondary heating would negate the original tempering of the tempered wire 18. As used herein, the term "secondary heating" refers to any post-tempering heating of wire to a temperature greater than about 100° C., and is intended to include heating that occurs during the plating step. For example, one common method of plating steel is with a molten zinc bath at about 540° C. This type of plating, however, is undesirable for the tempered wire 18. If the tempered wire 18 is subjected to the molten zinc bath, the temperature of the tempered wire 18 would increase. This increase in temperature would substantially reduce the original temper obtained at block 32. As a result, the manufactured wire 16, after plating, would lose the desired martensitic properties.

The in-line process 28, however, substantially avoids the need for secondary heating because the electroplating step at block 34 does not use a heated bath. The plating solution is electrically charged to adhere the plating compounds to the tempered wire 18 to form the finished surface 20. As such, the desired martensitic properties obtained by tempering are not lost during the plating.

Conventional electroplating techniques often require a post-plating heat treatment. This is because hydrogen is generated in the electroplating process, which does not immediately come to equilibrium. As such, conventional electroplating techniques require further time and temperature to stabilize the hydrogen. The post-plating heat treatment may substantially reduce the original temper from the wire production process, as discussed above. Also, secondary heat treatments higher than about 200° C. cause the hydrogen to react with carbon to form methane embrittlement.

Hydrogen embrittlement is another issue that is common with conventional plating techniques. Hydrogen embrittlement may cause grain structures of the steel material of wire to fracture. This is due to the cubic structure of iron. When wire is tempered, the tempered steel exhibits elongated cubes that form rhombahedrions. Monatomic hydrogen molecules are capable of passing through all metals and set in the steel. This causes iron carbide to break down into iron compounds and carbide compounds, and forces hydrogen atoms out and in between metal structures. Eventually, the monatomic hydrogen molecules are forced together to form hydrogen compounds ($H_2$), which correspondingly forms gas bubbles. Because of the stress in the structure of the steel, the generated hydrogen is squeezed and causes the grain structures in the steel to fracture.

During plating processes, hydrogen is generated and picked up into the steel. Generally, two to three parts-per-million (ppm) is the maximum allowable standard content of hydrogen in the chemistry of steel. Higher concentrations of hydrogen in the steel will cause grain structures to fracture. Keeping an allowable minimum amount of hydrogen in the steel product produced is a direct result of time, speed, temperature, and amount of current in the plating process.

With the in-line process 28 of the present invention, the tempered wire 18 moves through the plating solution at a rapid line speed at block 34. This minimizes the exposure time of the tempered wire 18 in the plating solution. As such, the amount of hydrogen generated is substantially reduced, precluding the need for a post-plating heat treatment to stabilize the hydrogen. This also substantially reduces the amount of hydrogen that is picked up in the steel (preferably less than about two ppm, by weight), which correspondingly reduces the effects of methane and hydrogen embrittlement.

Because of the rapid line speed, the temperature, and the amount of current applied, the in-line process 28 creates a window in which the martensitic properties of the tempered wire 18 can be achieved, the desired tensile maintained, and wherein the plating will not compromise them. In particular, the in-line process 28 may eliminate or be substantially free of a descaling step, may be eliminate or be substantially free of a secondary heating step, and may provide a hydrogen content in the manufactured wire 16 of under about one ppm by weight (based on the entire weight of the manufactured wire 16), thereby avoiding hydrogen embrittlement.

The finished article (e.g., the manufactured wire 16) is wire with a finished surface and that exhibits good martensitic properties. As discussed above, examples of suitable martensitic properties of the manufactured wire 16 include properties that substantially meet ASTM A229-99, ASTM A230-99, ASTM A231-04, ASTM A232-99, ASTM A401-03, ASTM A877-99, ASTM A878-00, and ASTM A1000-05. Examples of particularly suitable martensitic properties of the manufactured wire 16 include tensile strengths that substantially meet ASTM A229-99. Such a manufactured wire 16 is useful in the formation of torsion springs and extension springs.

Although the present invention has been described with reference to one or more embodiments, workers skilled in the art will recognize that changes may be made in form and detail without departing from the spirit and scope of the invention.

The invention claimed is:

1. A method of manufacturing plated wire, the method comprising:
    drawing a feed stock to form drawn wire;
    tempering the drawn wire to form tempered wire; and
    electroplating the tempered wire to form the plated wire, wherein the plated wire exhibits a tensile strength that substantially meets ASTM A229-99 and a hydrogen concentration of about two parts-per-million or less by weight after the electroplating.

2. The method of claim 1, wherein the tempering comprises heat induction tempering.

3. The method of claim 1, wherein the electroplating comprises electrodeposition.

4. The method of claim 1, wherein the tempering and the electroplating are performed using an in-line, continuous process absent of a descaling treatment.

5. The method of claim 1, wherein the plated wire further exhibits properties that substantially meet a standard that is selected from a group consisting of ASTM A230-99, ASTM A231-04, ASTM A232-99, ASTM A401-03, ASTM A877-99, ASTM A878-00, and ASTM A1000-05.

6. A method of manufacturing wire having a finished surface, the method comprising:

drawing the wire from a feed stock;

induction tempering the wire; and electroplating the wire with zinc using an in-line, continuous process substantially free of a descaling treatment and substantially free of secondary heat treatment to provide the finished surface on the wire, wherein the wire exhibits a hydrogen concentration of about two parts-per-million or less by weight after the electroplating, and wherein the wire is transported at a line speed of about 50 meters-per-minute to about 250 meters-per-minute through and between the induction tempering and electroplating steps.

7. The method of claim 6, wherein the electroplating comprises electrodeposition.

8. The method of claim 6, wherein after the induction tempering and the electroplating, the wire exhibits a tensile strength that substantially meets ASTM A229-99.

9. The method of claim 8, wherein after the induction tempering and the electroplating, the wire further exhibits properties that substantially meet a standard that is selected from a group consisting of ASTM A230-99, ASTM A231-04, ASTM A232-99, ASTM A401-03, ASTM A877-99, ASTM A878-00, and ASTM A1000-05.

10. The method of claim 6, wherein the wire exhibits a hydrogen concentration of about one part-per-million, or less, by weight.

11. The method of claim 6, wherein the finished surface has a thickness ranging from about one micron to about six microns.

12. The method of claim 6, wherein the wire comprises a metal having a composition, by weight, of carbon 0.55 to 0.85 percent, manganese 0.30 to 1.20 percent, phosphorous up to 0.04 percent, sulfur up to 0.05 percent, silicon 0.15 to 0.35 percent, and balance steel.

13. The method of claim 6, wherein the wire is maintained at a temperature of less than 100° C. during the electroplating step.

14. The method of claim 1, wherein the plated wire has a finished surface with a thickness ranging from about one micron to about six microns.

15. The method of claim 1, wherein the wire comprises a metal having a composition, by weight, of carbon 0.55 to 0.85 percent, manganese 0.30 to 1.20 percent, phosphorous up to 0.04 percent, sulfur up to 0.05 percent, silicon 0.15 to 0.35 percent, and balance steel.

16. The method of claim 1, wherein the wire is maintained at a temperature of less than 100° C. during the plating step.h

* * * * *